(12) United States Patent
Muramatsu

(10) Patent No.: US 6,191,409 B1
(45) Date of Patent: Feb. 20, 2001

(54) IMAGE SENSOR HAVING MEANS FOR CHANGING PREDETERMINED VOLTAGE

(75) Inventor: Yoshinori Muramatsu, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/304,528

(22) Filed: May 4, 1999

(30) Foreign Application Priority Data

May 6, 1998 (JP) .................................................. 10-123587

(51) Int. Cl.$^7$ ..................................................... H01L 27/00

(52) U.S. Cl. ................................... 250/208.1; 250/21 HP

(58) Field of Search ........................... 250/208.1, 214 P, 250/214 LA, 214 R; 348/294, 301, 302; 257/291; 396/164, 159, 166, 167

(56) References Cited

U.S. PATENT DOCUMENTS 5,780,884 * 7/1998 Kumagai et al. .................... 257/236

* cited by examiner

Primary Examiner—Que T. Le
(74) Attorney, Agent, or Firm—McGinn & Gibb, PLLC

(57) ABSTRACT

An image sensor comprises conversion cells ($41ij$) arranged into a matrix for generating conversion voltage in response to incident light, and a processing section for performing a processing of deriving the conversion voltage. The conversion cells comprise a transistor and a photodiode for changing, after predetermined voltage is set with the initial setting of the processing section, the predetermined voltage in response to incident light and outputting it as the conversion voltage, a transistor for amplifying the conversion voltage, a transistor for outputting the amplified conversion voltage to the processing section, and a transistor for applying voltage corresponding to the threshold of the transistor to predetermined voltage set to the photodiode upon the initial setting.

7 Claims, 7 Drawing Sheets

IMAGE SENSOR HAVING MEANS FOR CHANGING PREDETERMINED VOLTAGE

BACKGROUND OF THE INVENTION

1. Field of the Invention

The present invention relates to an image sensor being a photographing apparatus, and more specifically to a semiconductor image sensor.

2. Description of the Related Art

There are conventionally known as photographing devices CCD (Charge Coupled Device) image sensors and MOS (Metal Oxide Semiconductor) image sensors. The CCD image sensors are prevailing at present. Compared with the CCD image sensors, however, the MOS image sensors have the following advantages: the MOS image sensors require less power consumption, and includes an optical detection section and its peripheral circuit which can be integrated on the same chip.

As illustrated in FIG. 6, the aforesaid MOS image sensor includes a vertical scanning section 101, a horizontal scanning section 102, and a cell array 103. The vertical scanning section 101 outputs DC voltage V1 and a readout signal S2 to a cell array 103, and the horizontal scanning section 102 outputs a readout signal S2 to the cell array 103.

The cell array 103 converts incident light to an electric signal, and outputs a signal representing a picture image (hereinafter, referred to as a picture image signal ),and includes m×n conversion cells $111_{ij}$ (i=1 to m, j=1 to n), and regulated power supplies $112_1$ to $112_m$, as illustrated in FIG. 6.

The regulated current supplies $112_1$ to $112_m$, supply a regulated current to signal lines $113_1$ to $113_m$, respectively. The conversion cells $111_{ij}$ arranged in a matrix include transistors each of which is an enhancement N channel MOSFET (Field Effect Transistor) and a photodiode 124 for converting incident light to an electric signal, as illustrated in FIG. 7.

The vertical scanning section 101 vertically scans the cell array 103. The vertical scanning section 101 outputs DC voltage V1 and a high level reset signal S1 to the conversion cells $111_{ij}$ to $111_{mj}$ that are an object of vertical scanning. Hereby, a photodiode 124 of the conversion cell $111_{ij}$ is initialized. More specifically, the transistor 121 is switched on with the high level reset signal S1, and the DC voltage V1 is applied to the photodiode 124.

Consequently, the photodiode 124 stores electric charges thereon, and a voltage at a connection point (hereinafter, referred to as a node M) between the photodiode 124 and the transistor 122 becomes the DC voltage V1. The photodiode 124 is therefore initialized.

After completion of initialization of the photodiode 124, when a light is incident on the photodiode 124, electric charges stored in the photodiode 124 are reduced in response to the intensity of the incident light to a lower voltage at the node M. The voltage at the node M is a conversion signal that is a result of the conversion of the incident light.

Thereafter, the horizontal scanning section 102 horizontally scans the cell array 103. At this time, a high level readout signal S2 is inputted in order into the conversion cells $111_{ij}$ to $111_{jm}$ that are the object of the horizontal scanning. Hereby, the conversion signal amplified by the transistor 122 is outputted to the signal line $113_i$ after passage through the source follower transistor 123.

When the vertical/horizontal scanning for the conversion cells $111_{11}$ to $111_{m1}$ and the conversion cells $111_{1n}$ to $111_{mn}$ is finished, the horizontal scanning section 102 outputs a picture image signal.

The prior art technique suffers from the following difficulty. Each conversion cell $111_{ij}$ of the cell array 103 outputs the amplified conversion signal to the signal line $113_i$. The amplification is achieved with the transistor 122 of the conversion cell $111_{ij}$.

In contrast, the transistor 122 has a threshold, and further has an amplifying function for input voltage above the threshold. The threshold is however varied depending upon fine differences among dozes of doped impurities, and slight differences of gate configurations produced upon manufacturing. In other words, the transistors 122 have different thresholds which provide variations of the threshold of the transistor 122. Thus, noise of a fixed pattern due to the transistor 122 is generated on the aforesaid picture image signal.

SUMMARY OF THE INVENTION

The present invention has been made to solve the aforesaid problems of the prior art, and has an object to provide an image sensor capable of reducing an influence of variations of a threshold of an amplifying transistor included in a conversion cell.

To achieve the aforesaid object, an image sensor according to one aspect of the present invention is featured by comprising: a plurality of photoelectric conversion cells arranged in a matrix for generating conversion voltage in response to incident light; and a processing section for performing a processing of deriving the conversion voltage from each the photoelectric conversion cell, each the photoelectric conversion cell comprising: a conversion section for changing, after the predetermined voltage is set with initial setting of the processing section, the predetermined voltage in response to incident light and outputting the predetermined voltage as the conversion voltage; an amplifying device for amplifying the conversion voltage from the conversion section; an outputting section for outputting the conversion voltage amplified by the amplifying device to the processing section; and setting section for adding the voltage corresponding to the threshold of the amplifying device to the predetermined voltage set to the conversion section.

In the foregoing, the conversion section comprises a photodiode for changing, after the predetermined voltage is set with the initial setting, the predetermined voltage in response to the incident light and outputting the predetermined voltage as the conversion voltage, and a first switching device which is made conductive with a first signal outputted from the processing section upon the aforesaid initial setting to add the supply voltage supplied by the processing section to the photodiode as the predetermined voltage.

Further, in the foregoing it is preferable that the amplifying device is a field effect transistor in which the conversion voltage from the photodiode is applied to a gate thereof, and the supply voltage is applied to a source thereof to amplify the conversion voltage. The thus amplified conversion voltage is outputted from a drain thereof.

The processing section, after outputting the first signal, outputs a second signal and supplies the supply voltage while lowering the same, and the set means is a second switching device which is made conductive with the second signal from the aforesaid processing section to connect the gate of the field effect transistor to the drain.

The processing section supplies voltage above the threshold of the field effect transistor from the supply voltage while lowering the voltage above the threshold.

The second switching device is a field effect transistor which is made conductive with the second signal applied to the gate of the second switching device from the processing section.

The gate width of the second switching device is smaller than those of the other field effect transistors.

In accordance with the present invention, since the threshold of the amplifying device is applied to the predetermined voltage of the conversion section upon initial setting, an influence of variations of the threshold of the amplifying device can be removed from the conversion voltage.

Circuit construction of the setting section is simplified by using a switching device such as a field effect transistor as the setting section, whereby an influence of variations of the threshold of the amplifying device can be removed from the conversion voltage.

Since a switching device is used as in the setting section in a manner such that switching of conduction of the switching device is achieved with the second signal from the processing section, severe alteration of the setting section is prevented, whereby an influence of variations of the threshold of the amplifying device can be removed from the conversion voltage.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

In what follows, there will be described in more detail a preferred embodiment of the present invention with reference to the accompanying drawings.

Figure 1:
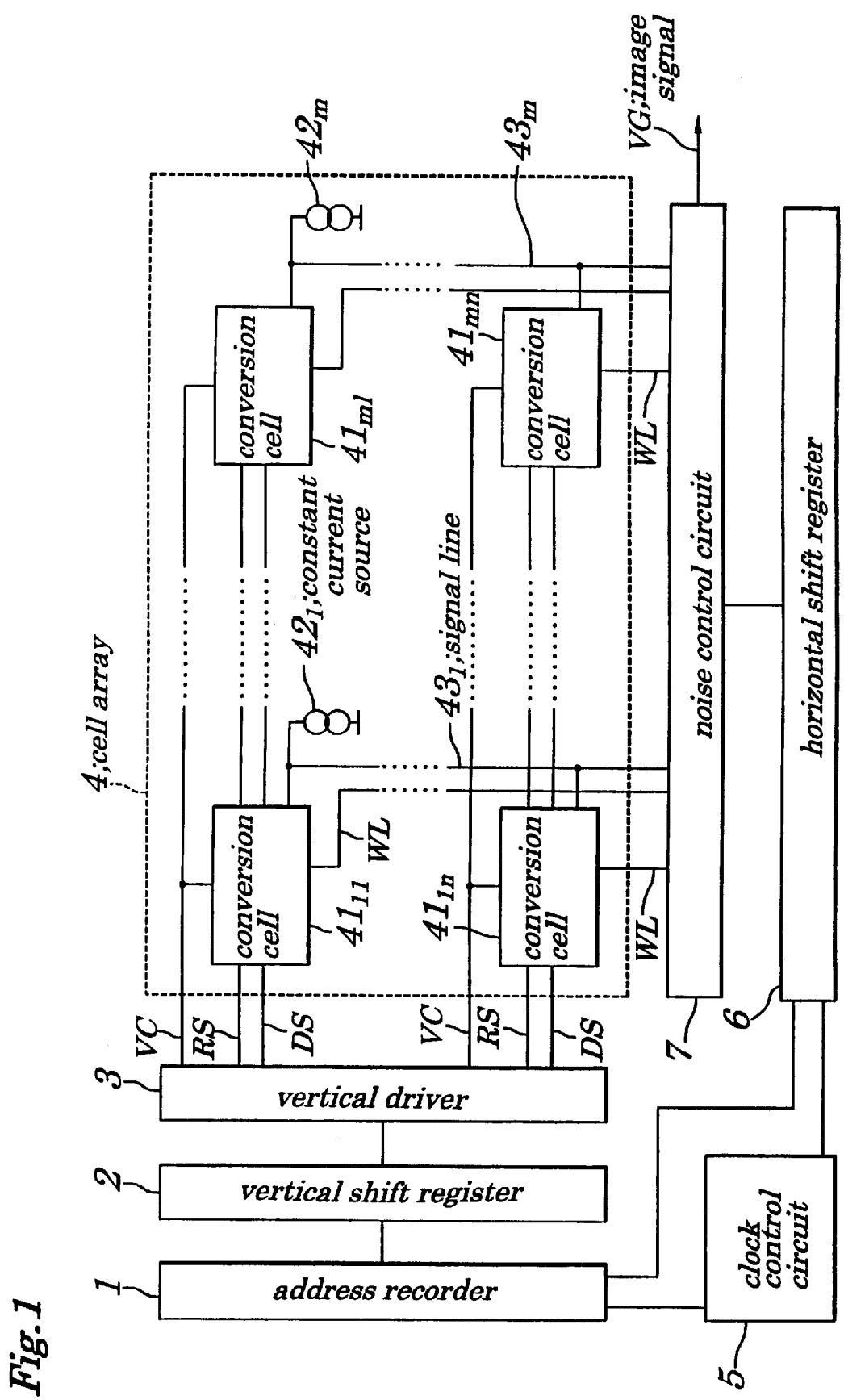
FIG. 1 is a circuit block diagram schematically illustrating the construction of an image sensor being a preferred embodiment of the present invention.
Figure 2:
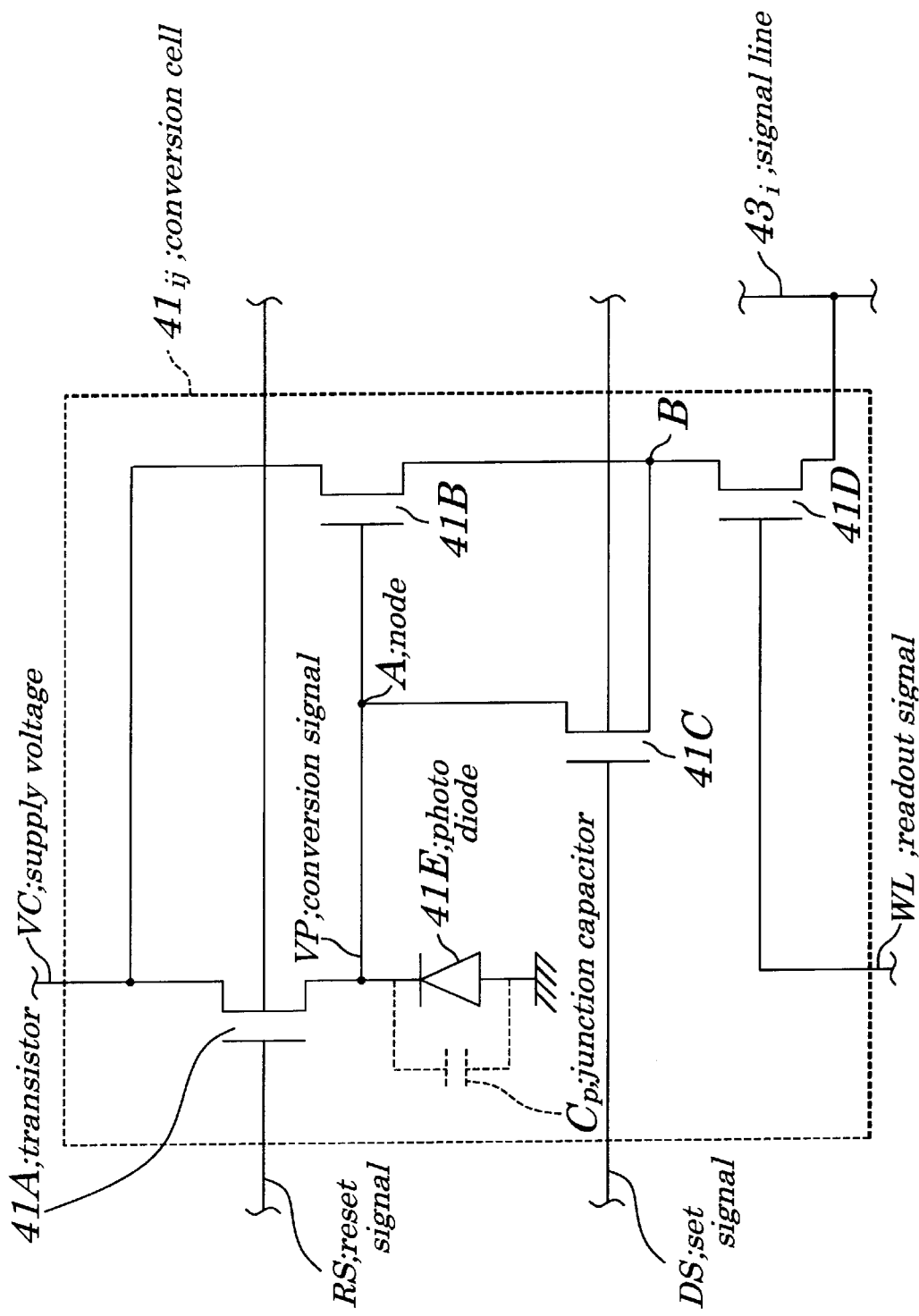
FIG. 2 is a circuit block diagram illustrating the construction of a cell array of the image sensor of FIG. 1.
Figure 3:
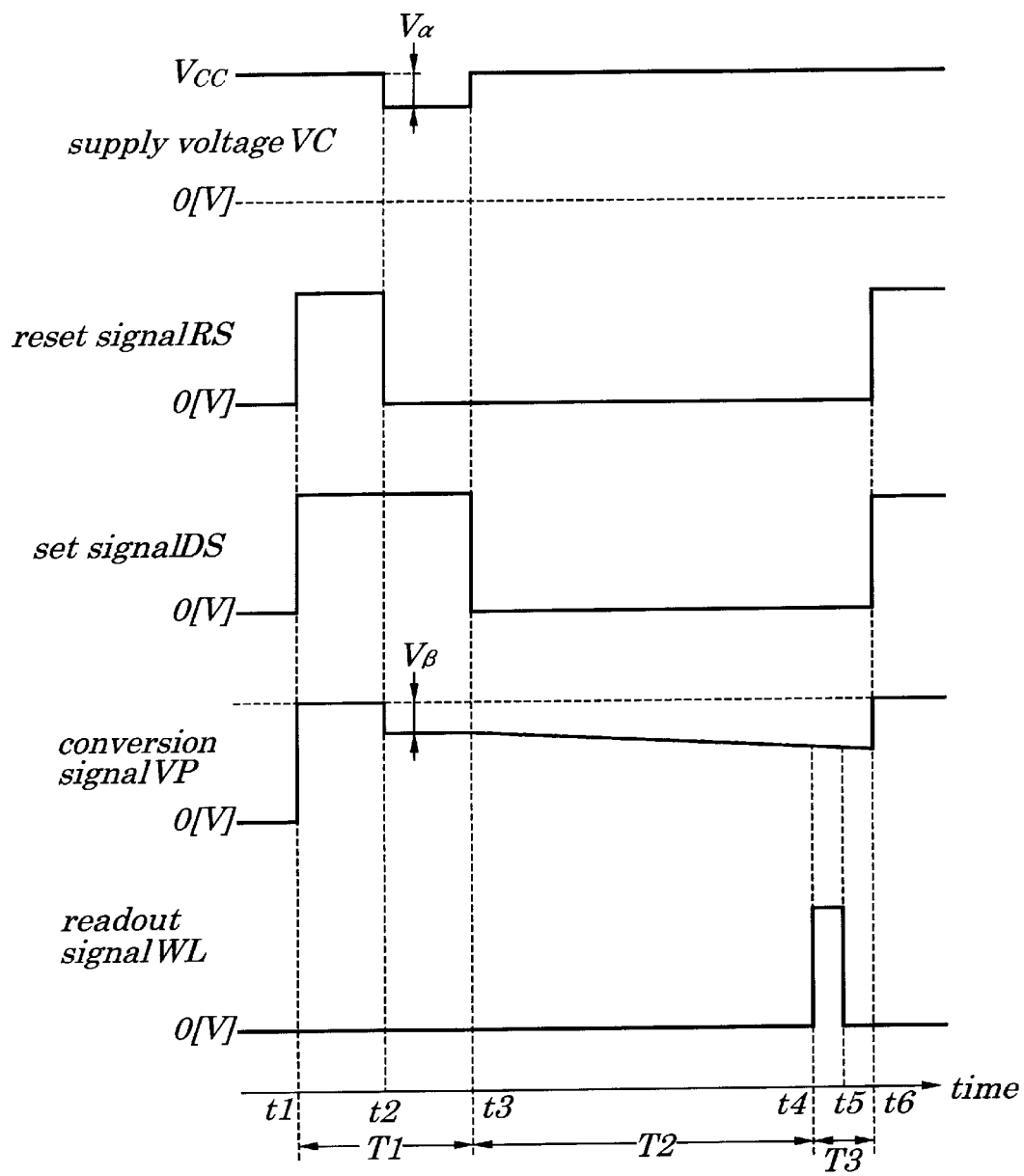
FIG. 3 is a view of waveforms illustrating the operation of a conversion cell of the image sensor of FIG. 1.
Figure 4:
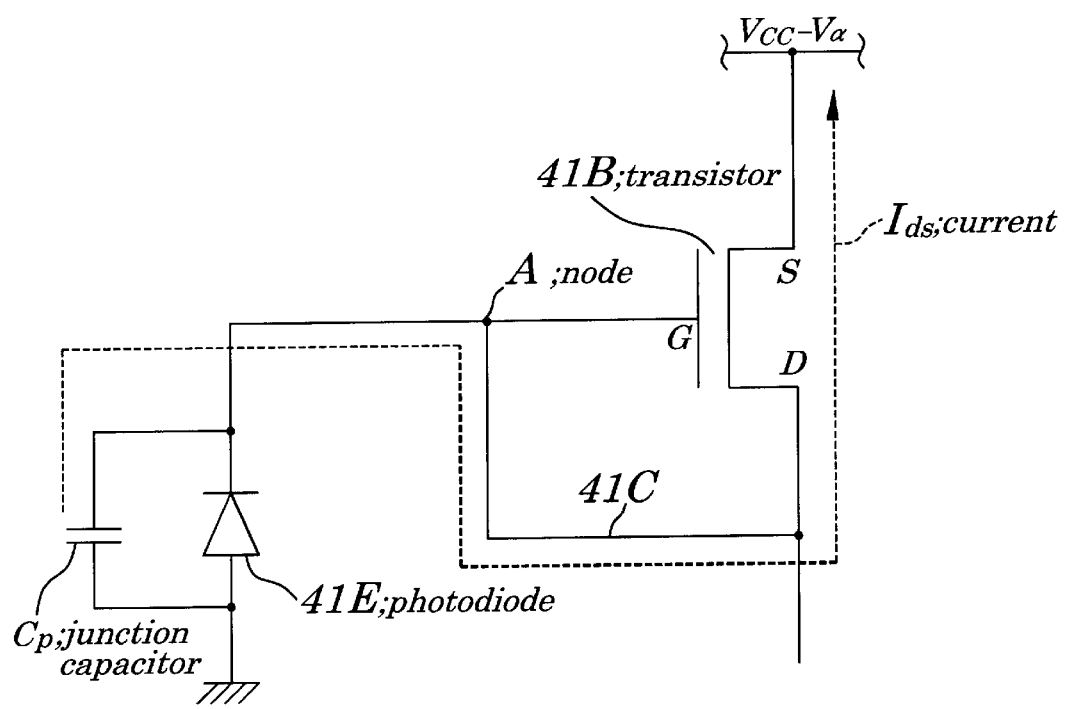
FIG. 4 is a view illustrating the situation of setting of the image sensor to the conversion cell of FIG. 1.
Figure 5:
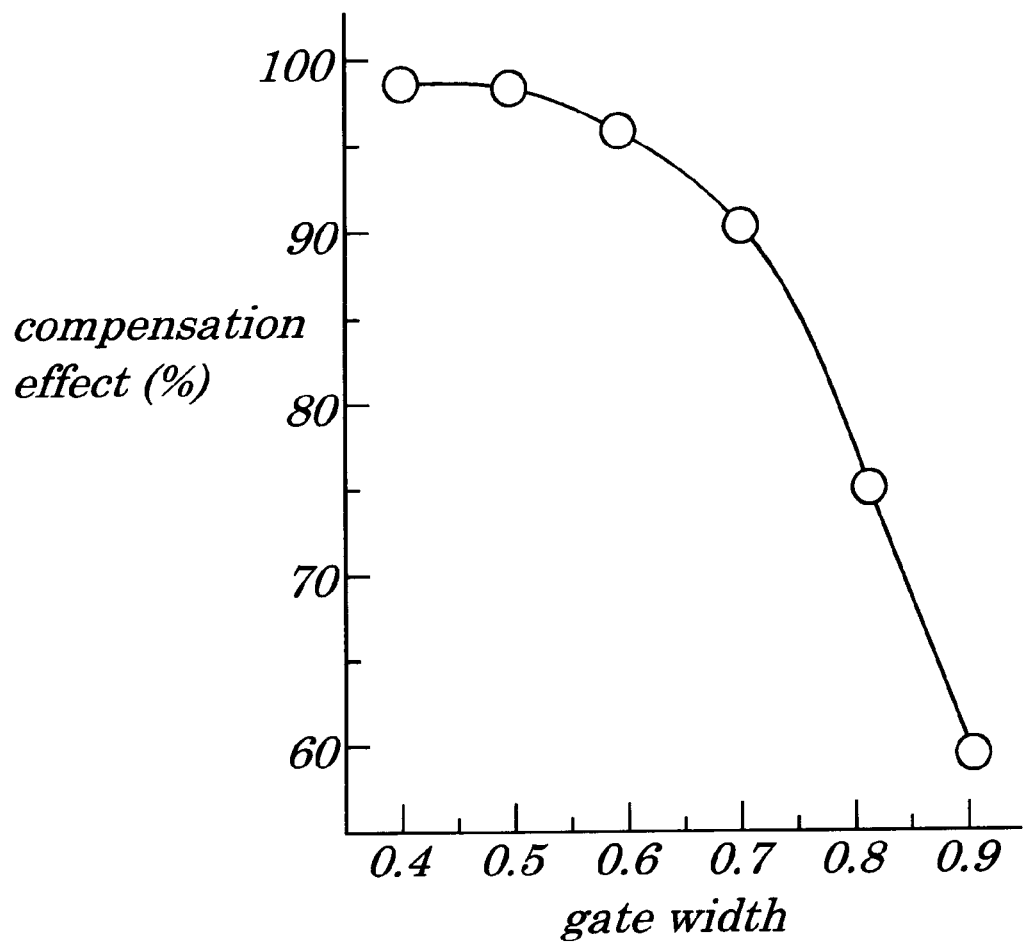
FIG. 5 is a graph illustrating the compensation effect by the image sensor.
Figure 6:
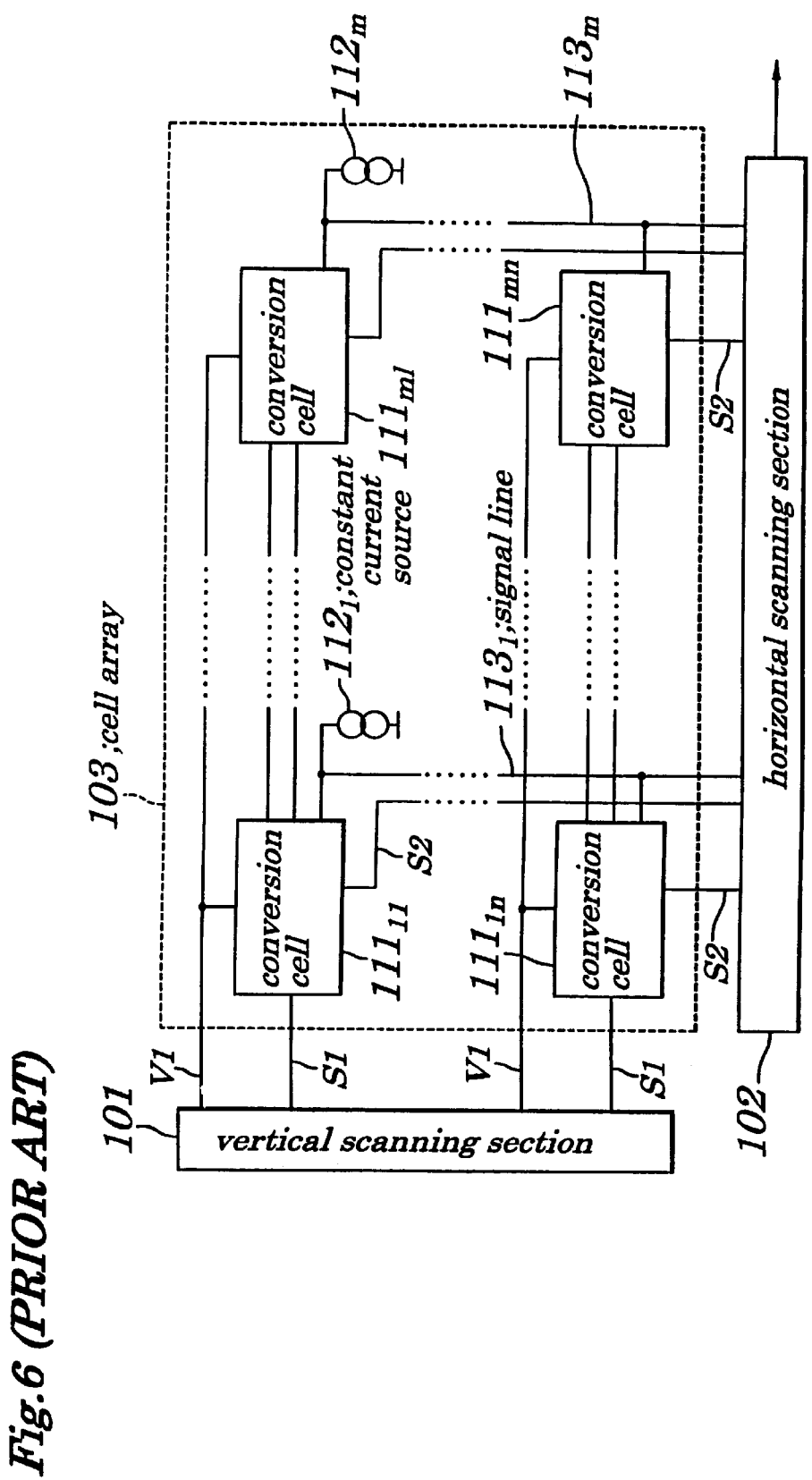
FIG. 6 is a circuit block diagram schematically illustrating the construction of a prior art MOS image sensor.
Figure 7:
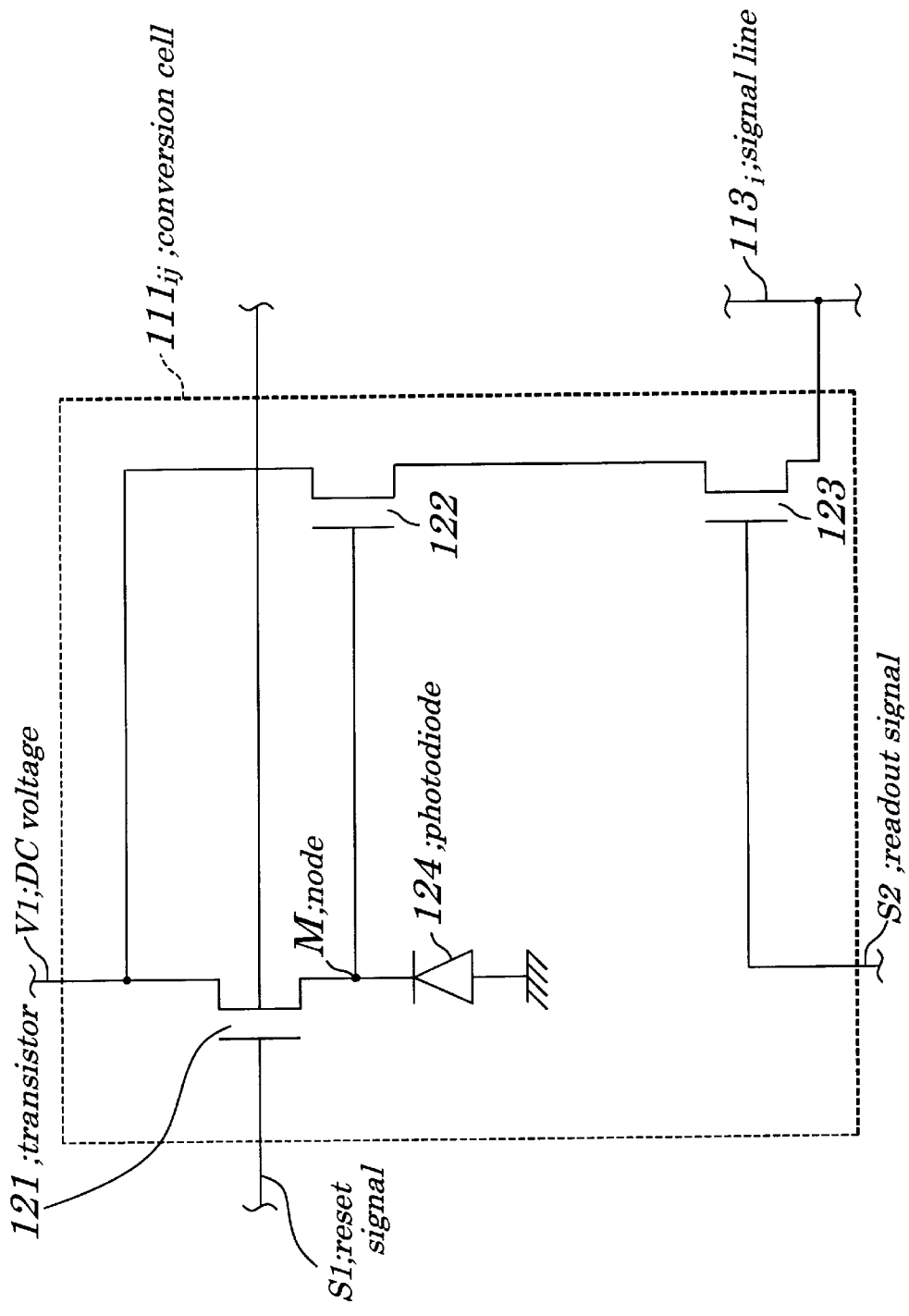
FIG. 7 is a circuit diagram illustrating the construction of a cell array used for the image sensor of FIG. 6.

FIG. 1 is a circuit block diagram schematically illustrating the construction of an image sensor being a preferred embodiment of the present invention; FIG. 2 is a circuit block diagram illustrating the construction of a cell array in the image sensor of FIG. 1; FIG. 3 is a view of waveforms illustrating the operation of a conversion cell of the image sensor of FIG. 1;

FIG. 4 is a view illustrating the situation of setting to a conversion cell of the image sensor of FIG. 1; and FIG. 5 is a graphical representation illustrating the compensation effect by the image sensor.

As illustrated in FIG. 1, in the present image sensor, an address recorder 1 is connected to a vertical shift register 2, which register 2 is then connected to a vertical driver 3. The vertical driver 3 is connected with a cell array 4, which array 4 is to output a picture image signal. A clock control circuit 5 is connected with the address recorder 1 and with a horizontal shift register 6, which register 6 is connected with a noise control circuit 7.

The cell array 4 includes m×n conversion cells $41_{ij}$ (i=1 to m, j=1 to n), and constant current sources $42_1$, to $42_m$, whereby the cell array 4 outputs a picture image signal.

The conversion cells $41_{ij}$ are disposed in a matrix. More specifically, m conversion cells $41_{1j}$ to $41_{mj}$ are disposed laterally on a line, and n column conversion cells $41_{11}$ to $41_{m1}$, . . . , $41_{1n}$ to $41_{mn}$ are longitudinally disposed. Addresses [1], . . . , [n] for vertical scanning are provided to each column of the conversion cells $41_{11}$ to $41_{m1}$, . . . , $41_{1n}$ to $41_{mn}$ disposed longitudinally, and addresses [1], . . . , [m] for horizontal scanning are provided to the respective conversion cells $41_{1j}$ to $41_{mj}$ disposed laterally.

The conversion cells $41_{ij}$ include transistors 41A to 41D, and a photodiode 41E, as illustrated in FIG. 2.

The photodiode 41E is a device to receive incident light reflected on a picture image, etc., and convert it to an electric signal. The photodiode 41E has an anode that is grounded, a cathode that is connected with a node (hereinafter, referred to as a node A) between a source of the transistor 41A and a gate of the transistor 41B.

The photodiode 41E is initialized with conduction of the transistor 41A, whereby the photodiode 41E stores electric charges on a junction capacitor Cp to bring voltage on the cathode, i.e., at the node A to supply voltage VC. Thereafter, the electric charges stored on the junction capacitor Cp by the photodiode 41E are adjusted by transistors 41B, 41C to include threshold Vh of the transistor 41B. The adjustment will be described later.

When the initialization is finished, and light is incident on the photodiode 41E, the electric charge stored on the junction capacitor Cp is reduced in response to the incident light to cause the conversion voltage that is the cathode voltage of the photodiode 41E to be reduced. When the incident light is intense, the conversion voltage is sharply reduced, and oppositely when the incident light is dim, the conversion voltage is reduced slightly. The photodiode 41E thus converts the incident light to an electric signal, and outputs the conversion voltage that is a conversion result to the node A as a conversion signal VP.

The transistor 41A is an enhancement N channel MOS·FET. The supply voltage VC from the vertical driver 3 is inputted to a drain of the transistor 41A, and the reset signal RS from the vertical driver 3 is inputted into the gate of the same. The cathode of the photodiode 41E is connected with the source of the transistor 41A.

The transistor 41A acts as a switching device which is switched on and off based upon the reset signal RS, whereby the photodiode 41E is set to an initial state. More specifically, when the reset signal RS becomes a high level, the transistor 41A is switched on to apply the supply voltage VC to the photodiode 41E. Hereby, the transistor 41A applies the supply voltage VC to the photodiode 41E to initialize the photodiode 41E.

The transistor 41B is an enhancement N channel MOS·FET. The supply voltage VC from the vertical driver 3 is inputted to the source of the transistor 41B, and the gate of the same is connected with the cathode of the photodiode 41E. The drain of the transistor 41B is connected with a node (hereinafter, referred to as a node B) between the source of the transistor 41C and the drain of the transistor 41D.

The transistor 41B is operable with a source grounded, amplifies the conversion signal VP generated at the cathode of the photodiode 41E, and outputs the conversion signal VP to the drain of the photodiode 41D.

The transistor 41B has a specific threshold Vh, which is often different depending upon transistors. Drain-source voltage Vds that is generated by a current flowing between the drain and the source of the transistor 41B is a value that is obtained by amplifying a difference between the conversion signal VP and the threshold Vh, and is represented by the following equation:

$$Vds=f(VP-Vh) \quad \ldots (1).$$

More specifically, the drain-source voltage Vds is generated when th conversion signal VP exceeds the threshold Vh. With the drain-source voltage Vds the drain of the transistor 41B outputs the amplified conversion signal VP to the transistor 41D.

The transistor 41C is an enhancement N channel MOS·FET. The drain of the transistor 41C is connected with the aforesaid node A. To the gate of the transistor 41C a set signal DS from the vertical driver 3 is inputted, and the source of the transistor 41C is connected with the aforesaid node B.

The transistor 41C is operable as a switching device that is switched on and off based upon the set signal DS. More specifically, the transistor 41C is switched on when the set signal DS becomes a high level, to connect the gate of the transistor 41B to the drain of the same.

The transistor 41D is an enhancement N channel MOS·FET. The drain of the transistor 41D is connected with the node B as described previously, and the source of the same is connected with a signal line 43$i$. To the gate of the transistor 41D a readout signal WL from the horizontal shift register 6 is inputted through the noise control circuit 7.

Since the transistor 41B is a source follower, the conversion signal VP amplified by the transistor 41B is outputted onto the signal line 43$i$ with low output impedance.

The clock control circuit 5 generates a clock signal which is then outputted to the address decoder 1, the vertical shift register 2, and the horizontal shift register 6.

The address decoder 1 holds addresses ⌈1⌋ to ⌈n⌋ for vertical scanning which are required for reproducing a picture image signal representative of one picture image from the cell array 4, and further holds addresses ⌈1⌋ to ⌈n⌋ for horizontal scanning.

The address recorder 1 outputs one address ⌈j⌋ for vertical scanning to the vertical shift register 2 based upon timing of the aforesaid clock signal, and then outputs the addresses ⌈1⌋ to ⌈m⌋ for horizontal scanning to the horizontal shift register 6 based upon timing of the aforesaid clock signal. Such outputting operation is performed by the address recorder 1 in order for the addresses ⌈1⌋ to ⌈n⌋ for vertical scanning.

The vertical shift register 2 once receiving the address ⌈j⌋ for vertical scanning from the address recorder 1, outputs an instruction to set the conversion cells $41_{ij}$ to $41_{mj}$ designated by the address ⌈j⌋ to the vertical driver 3 based upon the aforesaid timing of the clock signal.

The vertical driver 3 once receiving the instruction of setting from the vertical shift register 2, performs the setting operation for the conversion cells $41_{1j}$ to $41_{mj}$ of the address ⌈j⌋. More specifically, the vertical driver 3 outputs the supply voltage VC of a value Vcc to the conversion cells $41_{1j}$ to $41_{mj}$ The vertical shift register 2 outputs a high level reset signal RS to the conversion cells $41_{1j}$ to $41_{mj}$, and further outputs to the conversion cells $41_{1j}$ to $41_{mj}$, a set signal DS made a high level for a longer time than the pulse width of the reset signal RS.

Thereafter, the vertical driver 3, after setting the reset signal RS to a low level, lowers the supply voltage VC supplied to the conversion cells $41_{1j}$ to $41_{mj}$ from the value Vcc to a value Vcc−Vα. The value α is set to a slightly larger value than an average threshold Vh of the MOS·FET. Thereafter, the vertical driver 3, after setting the set signal DS to a low level, returns the supply voltage VC of the value Vcc−Vα to the value Vcc.

The horizontal shift register 6, after receiving the addresses ⌈1⌋ to ⌈m⌋ for horizontal scanning from the address recorder 1, performs the readout operation from a head conversion cell $41_{1j}$ in order up to the conversion cells $41_{mj}$. More specifically, the horizontal shift register 6 outputs the high level readout signal WL from the conversion cell $41_{1j}$ in order through the noise control circuit 7.

The noise control circuit 7, after receiving the amplified conversion signal VP from the horizontal shift register 6, removes noise from each conversion signal VP and outputs the conversion signal VP as the picture image signal VG.

In what follows, operation of the present embodiment will be described.

The address recorder 1, once starting vertical scanning for the cell array 4, outputs an address ⌈1⌋ to the vertical shift register 2. The vertical shift register2, after receiving the address ⌈1⌋, instructs to the vertical driver 3, starting a set processing to the conversion cells $41_{1j}$ to $41_{mj}$ designated by the address ⌈1⌋.

The vertical driver 3, once receiving the aforesaid instruction, outputs the supply voltage VC of the value Vcc to the conversion cells $41_{1j}$ to $41_{mj}$ at time t1 as illustrated in FIG. 3. Further, the vertical driver 3 outputs the high level reset signal RS and the set signal DS to the conversion cells $41_{1j}$ to $41_{mj}$ at the time t1. Hereby, the transistor 41A of the conversion cells $41_{1j}$ to $41_{mj}$ is switched on to input the supply voltage VC to the photodiode 41E and start initialization of the photodiode 41E. On the junction capacitor Cp of the photodiode 41E electric charges due to the supply voltage VC are stored, and the conversion signal VP outputted by the photodiode 41E becomes the value Vcc.

At time t2, as illustrated in FIG. 3, the vertical driver 3 makes the reset signal RS a low level, and reduces the value Vcc of the supply voltage VC by a value α into a value Vcc−Vα. Since at this time the transistor 41C is at an on state owing to the high level set signal DS, as illustrated in FIG. 4, the transistor 41B permits its gate (G) and drain (D) to be shortcircuitted therebetween by the transistor 41C. It should be herein noted that in FIG. 4 the transistor 41C is illustrated as a shortcircuitting line 41C.

Since at this state the voltage Vcc from the photodiode 41E is inputted to the gate (G) of the transistor 41B, the transistor 41B can flow a current between the drain (D) and the source (S). Further, since cathode voltage of the photodiode 41E is the value Vcc, and the value of the supply voltage VC is the lower value Vc−Vα than the cathode voltage, the electric charges stored on the junction capacitor Cp of the photodiode 41E migrate to the supply voltage VC. Therefore, as illustrated in FIG. 4, a current Ids flows to the supply voltage VC through the cathode of the photodiode 41E, the transistor 41C, and the transistor 41B.

When the current Ids flows, the electric charges on the junction capacitor Cp of the photodiode 41E are reduced, and hence the cathode voltage of the photodiode 41E is lowered. When a difference between the aforesaid cathode voltage and the value Vcc−Vα of the supply voltage VC becomes the same as the threshold Vh of the transistor 41B, the current Ids is prevented from flowing between the drain (D) and the source (S) of the transistor 41B. As a result, voltage between the gate (G) and the source (S) of the transistor 41B becomes equal to the threshold Vh. The situation is listed in the next table 1.

TABLE 1

| value of supply voltage (V) | value of node A (V) | presence of set effect |
|---|---|---|
| 3.3 | 3.3 | nonexistence |
| 2.5 | 3.3 | nonexistence |
| 2.0 | 3.2 | existence |
| 1.8 | 2.9 | existence |
| 1.5 | 2.5 | existence |

In Table 1, 3.3 V is used as the supply voltage VC. As evidenced from Table 1, when the supply voltage VC is kept at the predetermined value of 3.3 V, the difference between the value of the node A and the value of the supply voltage VC, i.e., the voltage between the gate (G) and the source (S) of the transistor 41B is 3.3−3.3=0 V. In this case, there is no effect of setting the voltage between the gate (G) and the source (S) of the transistor 41B to the threshold Vh (hereinafter, referred to as compensation effect.).

When the supply voltage VC is lowered from 3.3 volt by 0.8 volt (=Vα) to 2.5 V, the voltage between the gate (G) and the source (S) of the transistor 41B is 3.3−2.5=0.8 V. In this case, 0.8 V does not approximate the threshold Vh of the transistor 41B, and hence the aforesaid compensation effect is not available.

When the supply voltage VC is lowered from 3.3 V by 1.3 V (=Vα) to 2.0 V, the voltage between the gate (G) and the source (S) of the transistor 41B is 3.2−2.0=1.2 V. Since in this case 1.2 V approximates the threshold Vh of the transistor 41B, and hence the aforesaid compensation effect is available.

When the supply voltage VC is lowered from 3.3 V by 1.5 V (=Vα) to 1.8 V, the voltage between the gate (G) and the source (S) of the transistor 41B is 2.9−1.8=1.1 V. Since in this case, 1.1 V approximates the threshold Vh of the transistor 41B, the aforesaid compensation effect is available.

Further, when the supply voltage VC is lowered from 3.3 V by 1.8 V (=Vα) to 1.5 volt, the voltage between the gate (G) and the source (S) of the transistor 41B is 2.5−1.5=1.0 V. Since in this case 1.0 V approximates the threshold Vh of the transistor 41B, the aforesaid compensation effect is available.

Provided the value Vα by which the supply voltage VC is lowered is slightly larger than the threshold Vh of the transistor 41B, the voltage between the gate (G) and the source (S) of the transistor 41B can be set to the threshold Vh.

Thereupon, the cathode voltage of the photodiode 41E becomes a value (Vcc−Vα)+Vh. More specifically, the cathode voltage of the photodiode 41E is adapted to include, owing to the initialization of the photodiode 41E, the fixed value (Vcc−Vα) of the supply voltage Vc and the threshold Vh which is different depending upon the types of the transistors 41B.

Further, it has been found that provided the configuration of the transistor 41C is made smaller than those of other transistors including the transistor 41B, the aforesaid compensation effect is improved. More specifically, provided as illustrated in FIG. 5, the gate width of the transistor 41C is adapted to be 0.4 to 0.5 times those of the other transistors, the voltage between the gate and source of the transistor 41B can be equal to the threshold Vh of the transistor owing to the aforesaid compensation effect. Namely, the compensation ratio can be made about 100%.

Provided the gate width of the compensation transistor 41C is made smaller than the other transistors, the greater compensation effect is available.

At time t3, as illustrated in FIG. 3, the vertical driver 3 brings the set signal DS to a low level. With the set signal DS the initialization of the photodiode 41E is finished. Hereby, the transistor 41C turns off, and electric charges corresponding to the value (Vcc−Vα)+Vh are stored on the junction capacitor Cp of the photodiode 41E, and the photodiode 41E outputs the value (Vcc−Vα)+Vh to the gate of the transistor 41B as the conversion voltage at the initial state, i.e., the conversion signal VP.

At time t3, since the transistor 41A and the transistor 41C turn off, the photodiode 41E reaches an optical detection state. Thereafter, the electric charges on the junction capacitor Cp of the photodiode 41E are reduced in response to the incident light. As a result, the conversion signal VP due to the photodiode 41E becomes a value responsive to the intensity of the incident light.

At time t4, as illustrated in FIG. 3, the horizontal shift register 6 outputs the high level readout signal WL in order to the conversion cells $41_{1j}$ to $41_{mj}$. Hereby, the conversion signal from the photodiode 41E is amplified by the transistor 41B, and is outputted to the transistor 41D. At this time, the transistor 41B amplifies a signal obtained by subtracting the threshold Vh from the conversion signal VP following the previous equation (1).

In contrast, since the conversion signal VP in the initial state realized at the time t1 includes the threshold Vh, the conversion signal VP amplified by the transistor 41B becomes a fraction responsive to the intensity of the incident light. As a result, the threshold Vh of the transistor 41B is removed. Thus, the conversion signal VP amplified by the transistor 41B is outputted to the signal lines $43_1$ to $43_i$ after passage through the source follower transistor 41D up to time t5.

Thereafter, the initialization is again started from time t6 for the next horizontal scanning. The horizontal shift register 6 receives the amplified conversion signal VP from the signal lines $43_1$ to $43_m$, respectively, and outputs each conversion signal VP to the noise control circuit 7. The noise control circuit 7 removes involved noise from each conversion signal VP, and outputs the conversion signal VP as a picture image signal.

According to the present embodiment, as described above, since the threshold Vh added to the conversion signal VP upon the initialization is subtracted from the conversion signal VP upon the amplification, an influence of variations of the threshold Vh due to the transistor 41B of the conversion cells $41_{ij}$ is removed from the picture image signal.

Further, since the means for setting the threshold VP to the photodiode 41E upon the initialization is constructed with the transistor 41C, the transistor 41C can be provided on a chip on which there are formed the cell array 4, and the address recorder 1, vertical shift register 2, vertical driver 3, clock control circuit 5, horizontal shift register 6, and noise control circuit 7, all being peripheral circuits of the cell array.

Although the preferred embodiment of the present invention was described above in detail with reference to the accompanying drawings, concrete construction thereof is not limited to the aforesaid preferred embodiment, and the present invention may include any design alteration within a range not departing the scope of the present invention. For example, the present invention may be applied even to a one-dimensional sensor where the conversion cells are arranged laterally on a line.

It is thus apparent that the present invention is not limited to the above embodiments but may be changed and modified without departing from the scope and spirit of the invention.

Finally, the present application claims the priority of Japanese patent application No. Hei10-123587 filed on May 6, 1998, which is herein incorporated by reference.

What is claimed is:

1. An image sensor comprising:

a plurality of photoelectric conversion cells arranged in a matrix form for generating conversion voltage in response to incident light; and a processing section for performing a processing of taking out said conversion voltage from each said photoelectric conversion cell, each said photoelectric conversion cell comprising:

a conversion section for changing, after predetermined voltage is set by initial setting of said processing section, said predetermined voltage in response to the incident light and outputting said predetermined voltage as said conversion voltage;

an amplification device for amplifying said conversion voltage from said conversion section;

an output section for outputting said conversion voltage amplified by said amplification device to said processing section; and setting means for adding voltage corresponding to a threshold of said amplification device to predetermined voltage set to said conversion section upon said initial setting.

2. An image sensor according to claim 1 wherein said conversion section includes a photodiode for changing, after said predetermined voltage is set with said initial setting, said predetermined voltage in response to incident light to output said predetermined voltage as said conversion voltage, and a first switching device which is made conductive with a first signal outputted from said processing section upon said initial setting to apply supply voltage supplied from said processing section to said photodiode as said predetermined voltage.

3. An image sensor according to claim 2 wherein said amplification device is a field effect transistor in which said conversion voltage of said photodiode is applied to a gate of the transistor, and said supply voltage is applied to a source of the transistor to amplify said conversion voltage, said conversion voltage thus amplified being outputted from a drain of the transistor.

4. An image sensor according to claim 3 wherein said processing section outputs a second signal and lowers and supplies said supply voltage, and said setting means is a second switching device which is made conductive with the second signal from said processing means to connect said gate of said field effect transistor to said drain.

5. An image sensor according to claim 4 wherein said processing means supplies voltage higher than a threshold of said field effect transistor from said supply voltage after lowering the voltage higher than a threshold of the field effect transistor.

6. An image sensor according to claim 4 wherein said second switching device is a field effect transistor which is made conductive with said second signal applied to the gate and provided from said processing means.

7. An image sensor according to claim 6 wherein the gate width of said second switching device is less than that of other said field effect transistor.

* * * * *